United States Patent
Eyer

(10) Patent No.: US 9,277,183 B2
(45) Date of Patent: Mar. 1, 2016

(54) SYSTEM AND METHOD FOR DISTRIBUTING AUXILIARY DATA EMBEDDED IN VIDEO DATA

(75) Inventor: Mark Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 12/798,118

(22) Filed: Mar. 30, 2010

(65) Prior Publication Data

US 2011/0088075 A1    Apr. 14, 2011

Related U.S. Application Data

(60) Provisional application No. 61/251,099, filed on Oct. 13, 2009.

(51) Int. Cl.
*H04N 7/173* (2011.01)
*H04N 5/445* (2011.01)
*H04N 21/235* (2011.01)
*H04N 21/236* (2011.01)
*H04N 21/2665* (2011.01)
*H04N 21/434* (2011.01)
(Continued)

(52) U.S. Cl.
CPC ........... *H04N 7/173* (2013.01); *H04N 5/44508* (2013.01); *H04N 21/235* (2013.01); *H04N 21/236* (2013.01); *H04N 21/2665* (2013.01); *H04N 21/434* (2013.01); *H04N 21/44008* (2013.01); *H04N 21/47205* (2013.01); *H04N 21/8133* (2013.01); *H04N 21/8173* (2013.01)

(58) Field of Classification Search
CPC ................................. H04N 7/17318
USPC ........................................... 725/119; 348/739
See application file for complete search history.

(56) References Cited

U.S. PATENT DOCUMENTS 5,659,368 A * 8/1997 Landis .......................... 348/467
6,055,023 A * 4/2000 Rumreich et al. ............ 348/553
(Continued)

FOREIGN PATENT DOCUMENTS

KR    1020090044506    5/2009
KR    10-2009-0060311    6/2009
(Continued)

OTHER PUBLICATIONS

Office Action issued Jun. 25, 2013, in Korean Patent Application No. 10-2012-7012157 (with English-language Translation).
(Continued)

*Primary Examiner* — Nathan Flynn
*Assistant Examiner* — Alfonso Castro
(74) *Attorney, Agent, or Firm* — Oblon, McClelland, Maier & Neustadt, L.L.P.

(57) ABSTRACT

A system and method for distributing auxiliary data embedded in video data includes a content source that embeds the auxiliary data into the video data. The content source then encodes the video data together with the auxiliary data to create a distribution multiplex including compressed video data. A decoder receives and decompresses the distribution multiplex to reproduce the video data with the auxiliary data embedded. A television or other device then detects and extracts the auxiliary data from the video data. The television or other device processes the auxiliary data to support a variety of possible interactive applications including displaying a synchronized widget on a display of the television.

25 Claims, 12 Drawing Sheets

(51) Int. Cl.
 *H04N 21/44*  (2011.01)
 *H04N 21/472* (2011.01)
 *H04N 21/81* (2011.01)

(56) References Cited

U.S. PATENT DOCUMENTS

| | | | |
|---|---|---|---|
| 6,411,725 B1 * | 6/2002 | Rhoads | 382/100 |
| 6,590,996 B1 * | 7/2003 | Reed | G06T 1/0021 |
| | | | 235/468 |
| 6,614,914 B1 * | 9/2003 | Rhoads et al. | 382/100 |
| 7,676,822 B2 * | 3/2010 | Forler et al. | 725/32 |
| 2002/0026362 A1 | 2/2002 | Tanaka | |
| 2003/0014748 A1 * | 1/2003 | Ben-David et al. | 725/23 |
| 2003/0110511 A1 * | 6/2003 | Schutte et al. | 725/131 |
| 2004/0022444 A1 * | 2/2004 | Rhoads | G06K 9/00577 |
| | | | 382/232 |
| 2006/0274952 A1 * | 12/2006 | Nakai | 382/232 |
| 2008/0089552 A1 * | 4/2008 | Nakamura et al. | 382/100 |
| 2008/0120637 A1 | 5/2008 | Deiss | |
| 2009/0100361 A1 | 4/2009 | Abello et al. | |
| 2009/0172746 A1 * | 7/2009 | Aldrey et al. | 725/61 |
| 2009/0254632 A1 * | 10/2009 | Kannan et al. | 709/217 |
| 2009/0262238 A1 | 10/2009 | Hope et al. | |
| 2009/0265738 A1 * | 10/2009 | Liao | 725/40 |
| 2010/0086283 A1 * | 4/2010 | Ramachandran et al. | 386/95 |
| 2010/0131981 A1 * | 5/2010 | Choi | 725/40 |
| 2011/0078753 A1 * | 3/2011 | Christianson et al. | 725/109 |

FOREIGN PATENT DOCUMENTS

| | | |
|---|---|---|
| WO | WO 2008/027321 A2 | 3/2008 |
| WO | WO 2009/057950 A2 | 5/2009 |

OTHER PUBLICATIONS

Extended European Search Report issued Apr. 25, 2014 in Patent Application No. 10823724.9.
Combined Chinese Office Action and Search Report issued May 14, 2014 in Patent Application No. 201080046101.2 (with English language translation).

* cited by examiner

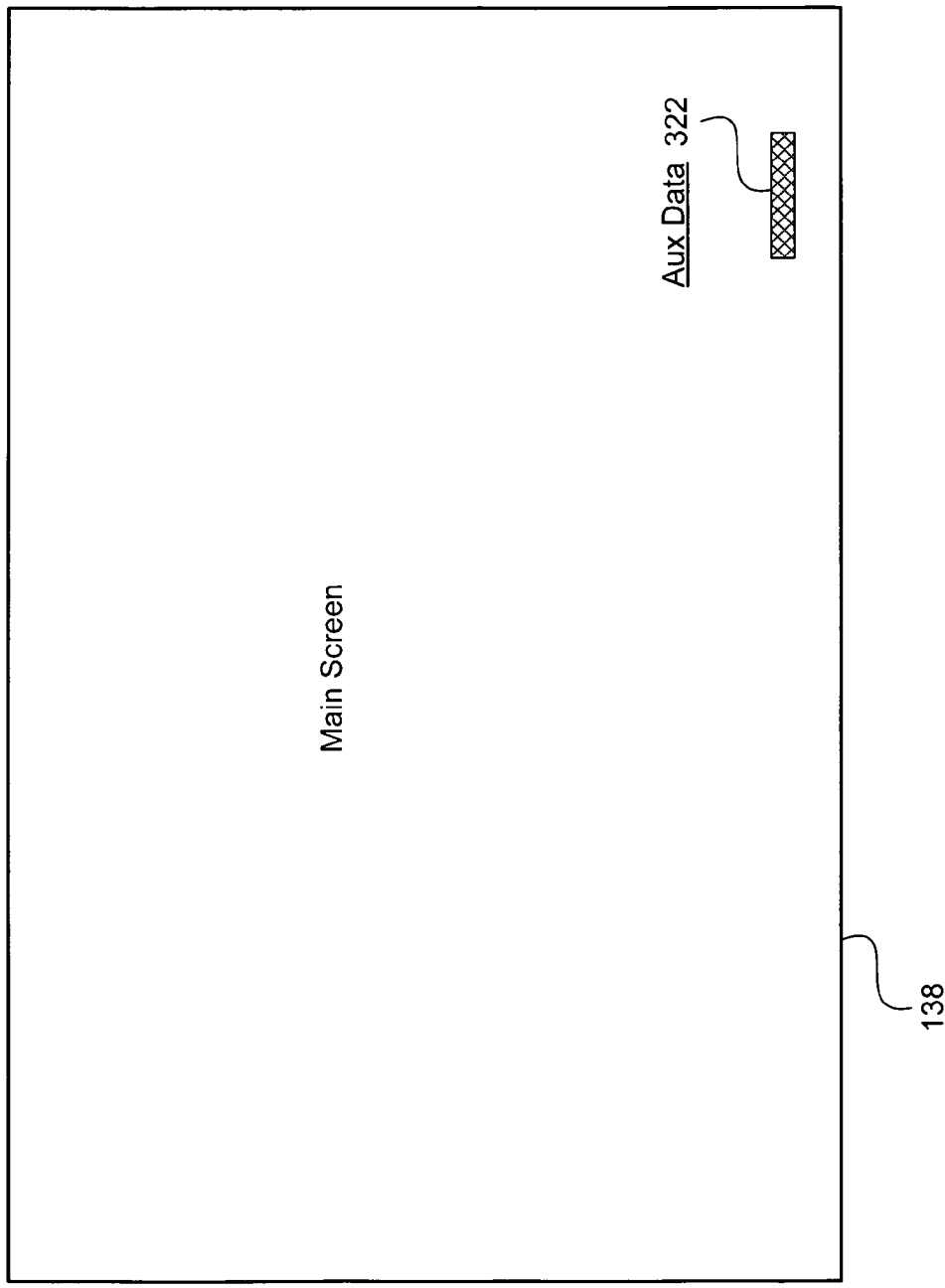

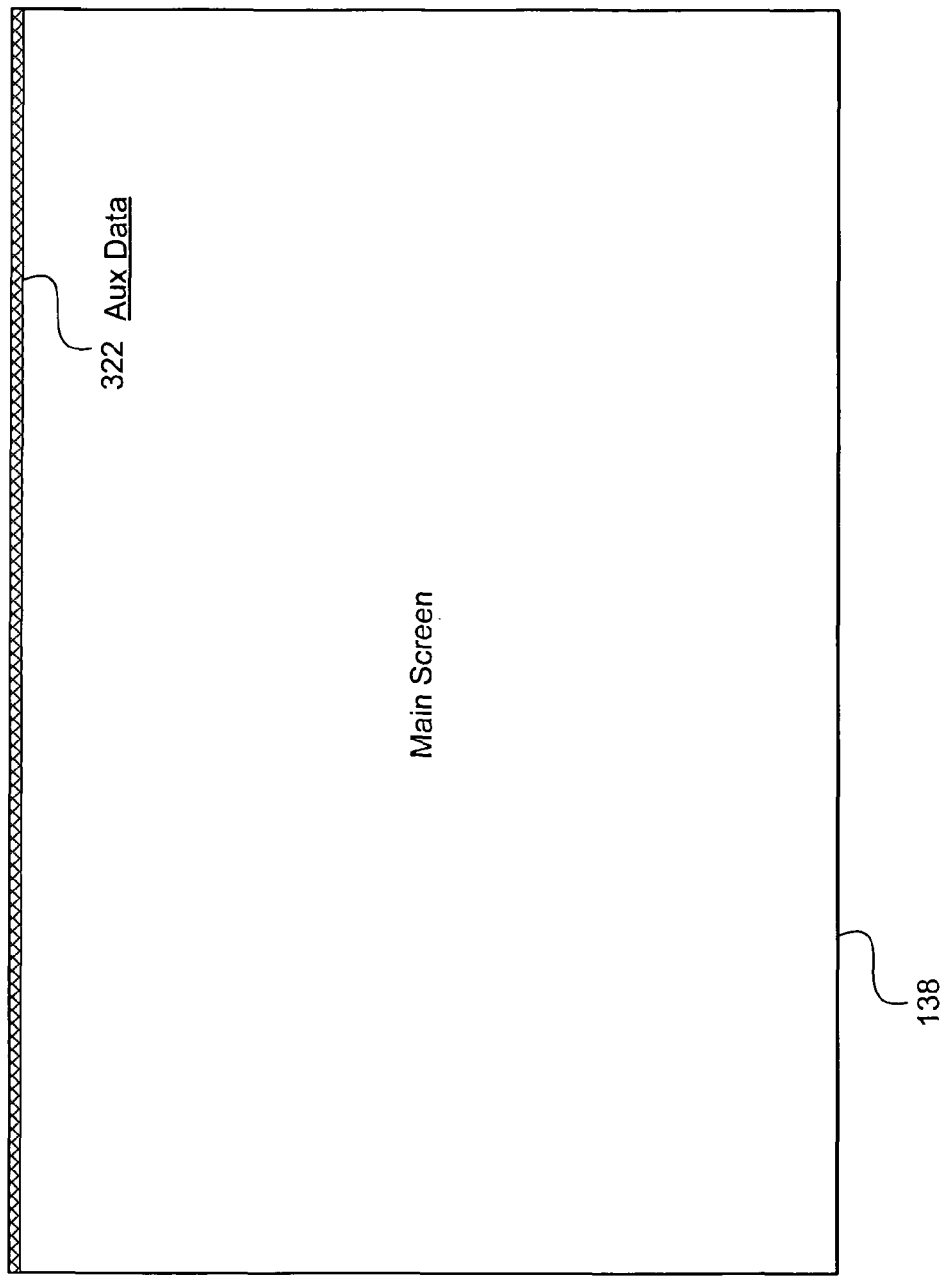

US 9,277,183 B2

SYSTEM AND METHOD FOR DISTRIBUTING AUXILIARY DATA EMBEDDED IN VIDEO DATA

CROSS-REFERENCE TO RELATED APPLICATIONS

This Application claims priority in, U.S. Provisional Patent Application No. 61/251,099 entitled "Video-Embedded Metadata" that was filed on Oct. 13, 2009. The foregoing related Application is commonly assigned, and is hereby incorporated by reference.

BACKGROUND SECTION

1. Field of the Invention

This invention relates generally to techniques for implementing television systems, and relates more particularly to a system and method for distributing auxiliary data embedded in video data.

2. Description of the Background Art

Implementing effective methods for distribution of metadata within digital television systems is a significant consideration for designers and manufacturers of contemporary electronic entertainment systems. However, effectively implementing such systems may create substantial challenges for system designers. For example, enhanced demands for increased system functionality and performance may require more capabilities and require additional hardware and software resources. Impediments to the effective delivery of metadata in advanced systems may result in a corresponding detrimental economic impact due to operational inefficiencies, lost revenue opportunities, and reduced functionality.

Furthermore, enhanced system capability to perform various advanced operations can offer additional benefits to the end user, but may also place increased demands on the control and management of various system components. For example, an enhanced electronic system that effectively supports synchronized television widget functionality may benefit from methods providing flexible carriage of the data stream supporting this functionality.

Due to growing demands on system resources and substantially increasing data magnitudes, it is apparent that developing new techniques for implementing and utilizing data distribution through digital television systems is a matter of concern for related electronic technologies. Therefore, for all the foregoing reasons, developing effective systems for implementing and utilizing data distribution through digital television systems remains a significant consideration for designers, manufacturers, and users of contemporary electronic entertainment systems.

SUMMARY

In accordance with the present invention, a system and method are disclosed for distributing auxiliary data embedded in video data. In accordance with one embodiment of the present invention, a content source or other appropriate entity initially produces content data that typically includes video data and audio data. The content source or other appropriate entity then creates auxiliary data to support advanced interactive features such as "synchronized widgets" or Internet-enhanced interactivity on a television device. The content source or other appropriate entity inserts or embeds the auxiliary data into the video data.

The content source or other appropriate entity then encodes the audio data and the video data (including the embedded auxiliary data) to create a compressed distribution multiplex. The content source or other appropriate entity distributes the distribution multiplex in any effective manner to a television in an electronic network. In certain embodiments, a decoder device of a set-top box or other appropriate entity receives and decodes the distribution multiplex distributed by the content source to reproduce uncompressed audio data and uncompressed video data (including the embedded auxiliary data).

A detection module of the television scans the video data to locate the embedded auxiliary data by utilizing any effective techniques. Next, an extraction module of the television extracts the located auxiliary data from the video data. Finally, an auxiliary data module of the television processes the extracted auxiliary data to successfully display and support one or more interactive applications residing in the television. For all of the foregoing reasons, the present invention thus provides an improved system and method for distributing auxiliary data embedded in video data.

BRIEF DESCRIPTION OF THE DRAWINGS

FIGS. 7A and 7B are diagrams of auxiliary data embedded in video data, in accordance with two different embodiments of the present invention.

DETAILED DESCRIPTION

The present invention relates to an improvement in television systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for distributing auxiliary data embedded in video data, and includes a content source that embeds the auxiliary data into the video data. The content source then encodes the video data together with the auxiliary data to create a distribution multiplex including compressed video data. A decoder receives and decompresses the distribution multiplex to reproduce the video data with the auxiliary data embedded. A television or other device then detects and extracts the auxiliary data from the video data. The television or other device processes the auxiliary data to support a variety of possible interactive applications including displaying a synchronized widget on a display of the television.

Figure 1A:
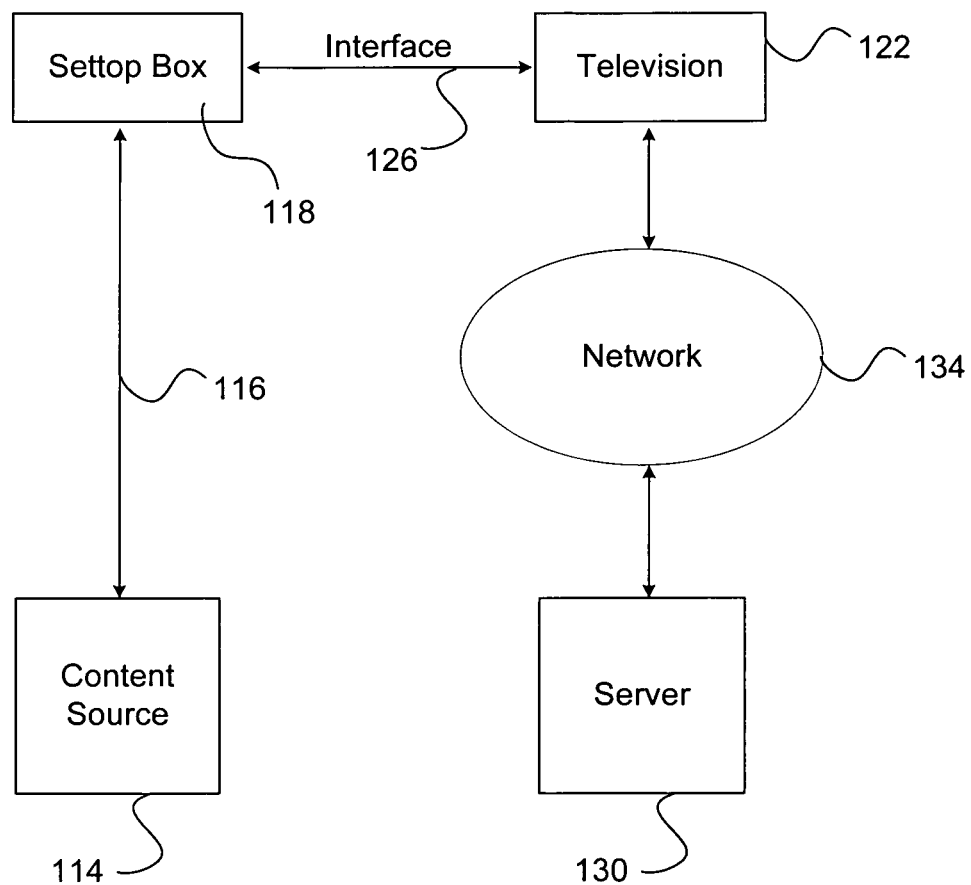
FIG. 1A is a block diagram of an electronic system, in accordance with one embodiment of the present invention.

Referring now to FIG. 1A, a block diagram of an electronic system 110 is shown, in accordance with one embodiment of the present invention. In the FIG. 1A embodiment, electronic system 110 may include, but is not limited to, a content source 114, a set-top box 118, an interface 126, a television 122, an optional network 134, and an optional server 130. In alternate embodiments, electronic system 110 may be implemented using components and configurations in addition to, or instead of, certain of those components and configurations discussed in conjunction with the FIG. 1A embodiment. For example, any number of televisions 122 may be similarly deployed in electronic system 110. In addition, network 134 and server 130 may not be included in all embodiments of the present invention.

In the FIG. 1A embodiment, content source 114 may be implemented as one or more electronic devices or other entities that prepare and distribute content data, including video data and audio data, for reproduction by television 122. In the FIG. 1A embodiment, content source 114 may be implemented as any appropriate entity. For example, content source 114 may include a television broadcasting facility, a satellite television distribution facility, or an Internet server entity. Additional details regarding the implementation and utilization of content source 114 are further discussed below in conjunction with FIGS. 2-4.

In the FIG. 1A embodiment, content source 114 creates an encoded distribution multiplex containing the content data in a compressed format, and then distributes the distribution multiplex through a distribution network via path 116 to a decoder device. In the FIG. 1A embodiment, the decoder device is implemented in a set-top box 118. However, in other embodiments, the decoder device may be implemented as any appropriate entity, either external to, or integral with, television 122. In certain embodiments, additional devices or entities may be interposed between content source 114 and set-top box 118. Examples of such entities may include, but are not limited to, a broadcast network affiliate and a service provider (such as a satellite or cable head-end).

In the FIG. 1A embodiment, set-top box 118 decodes the encoded distribution multiplex to generate uncompressed A/V data (video data and audio data) that is provided to television 122 via an appropriate interface 126. In the FIG. 1A embodiment, interface 126 may be implemented in any effective manner. For example, interface 126 may be implemented according to a High Definition Multimedia Interface (HDMI) standard that provides a high-speed parallel interface to deliver uncompressed video data and audio data, and control/timing signals to television 122. Television 122 may then responsively receive and reproduce the video data and audio data for utilization by a system user. Additional details regarding the implementation and utilization of television 122 are further discussed below in conjunction with FIGS. 5-6.

In the FIG. 1A embodiment, electronic system 110 supports the creation and display of various types of "widgets" on television 122 in addition to the main content data. Widgets may include discrete areas that are displayed on television 122 to provide any desired type of information. Additional details regarding widgets are further provided below in conjunction with FIG. 1B. In the FIG. 1A embodiment, electronic system 110 advantageously supports synchronized widgets that provide information that is related to (synchronized) to the main content data that is currently being displayed on television 122. In order to successfully support synchronized widgets, electronic system 110 also provides certain types of auxiliary data to television 122.

In various embodiments, television 122 may obtain auxiliary data from any appropriate source including, but not limited to, content source 114 or server 130. In the FIG. 1A embodiment, television 122 may communicate with server 130 via any effective network 134 including, but not limited to, the Internet. Additional details regarding the creation, distribution, and utilization of auxiliary data are further discussed below in conjunction with FIGS. 4, 7, and 8.

The present invention generally involves embedding auxiliary data in a video signal so that the auxiliary data may be quickly and easily recovered by receiving devices like television 122. In certain embodiments, content source 114 inserts auxiliary data within a distributed video signal so that the auxiliary data travels through the distribution chain, comes into a consumer's home via a compressed interface (from a cable, satellite, or IPTV service provider), is decompressed in set-top box 118, and then travels to television 122 in an uncompressed format, where television 122 retrieves and utilizes the embedded auxiliary data to support synchronized widgets. The foregoing techniques are intended to circumvent service providers or other entities from blocking the consumer's access to auxiliary data that is required to provide enhanced functionality to television 122.

Certain cable, satellite, and IPTV entities typically provide system users with set-top boxes that are interfaced to digital televisions via HDMI uncompressed video interfaces or other appropriate means. If a content owner wishes to include auxiliary data (such as a URL, applet, etc.) with the content data, and if that auxiliary data travels with the content data as a separate digital stream (or as metadata within the compressed bit stream), the auxiliary data will be blocked at the set-top box 118.

Conventionally, a set-top box 114 does not pass ancillary data streams in the distribution multiplex, because the set-top box decodes only audio data and video data, and then passes only the uncompressed video data and audio data across to the television. Ancillary data streams are therefore unavailable to the television. If service providers (those offering the set-top boxes) perceive that providing access to any ancillary data is competitive to their business model, they may not be inclined to help the consumer electronics industry by providing such access.

By embedding auxiliary data within the video data, the auxiliary data survives compression/decompression and is able to arrive intact at television 122. In other words, the present invention advantageously embeds auxiliary data within the video signal (encoded within the video image, not as a separate ancillary data stream). The present invention therefore successfully overcomes the architectural roadblock discussed above. The implementation and utilization of the FIG. 1A electronic system 110 is further discussed below in conjunction with FIGS. 1B-8B.

Figure 1B:
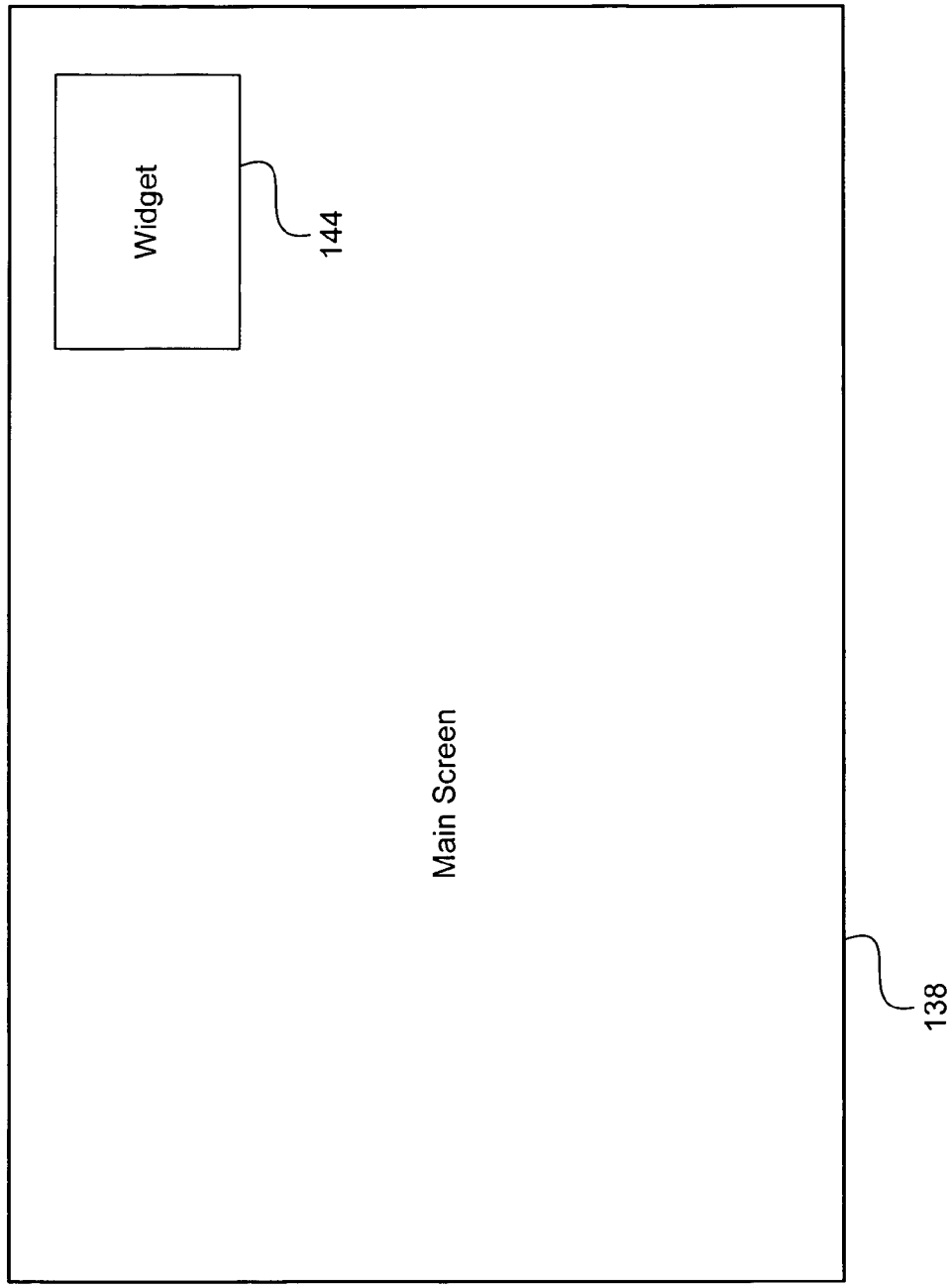
FIG. 1B is a diagram of a display from the television of FIG. 1A, in accordance with one embodiment of the present invention.

Referring now to FIG. 1B, a diagram of a display 138 from the television 122 of FIG. 1A is shown, in accordance with one embodiment of the present invention. The FIG. 1B embodiment is presented for purposes of illustration, and in alternate embodiments, display 138 may be implemented using components and configurations in addition to, or instead of, certain of those components and configurations discussed in conjunction with the FIG. 1B embodiment.

In the FIG. 1B embodiment, display 138 includes a main screen region that typically displays video data provided by a content source 114 (FIG. 1A). In the FIG. 1B embodiment, display 138 also includes a widget 144 that resides in a discrete area displayed on display 138 to provide any desired type of additional information. In various different embodiments, widget 144 may be implemented in any desired shape or size, and may be displayed in any appropriate location. Furthermore, any desired number of different widgets are equally contemplated, including the possibility of multiple widgets on the display at any given time.

In the FIG. 1B embodiment, display 138 supports synchronized widgets that function to provide information that is related (synchronized) to the video data that is currently being displayed on display 138. For example, widget 144 may be utilized to display financial information of specific relevance to the viewer (e.g., his/her investment portfolio) during a television program regarding economic news or investment topics. In another example, widget 144 may be utilized during a televised automobile race to display relevant information or statistics regarding specific race car drivers, racecars, or automobile racing in general. Additional details regarding the implementation and utilization of synchronized widgets 144 is further discussed below in conjunction with FIGS. 2-8B.

Figure 2:
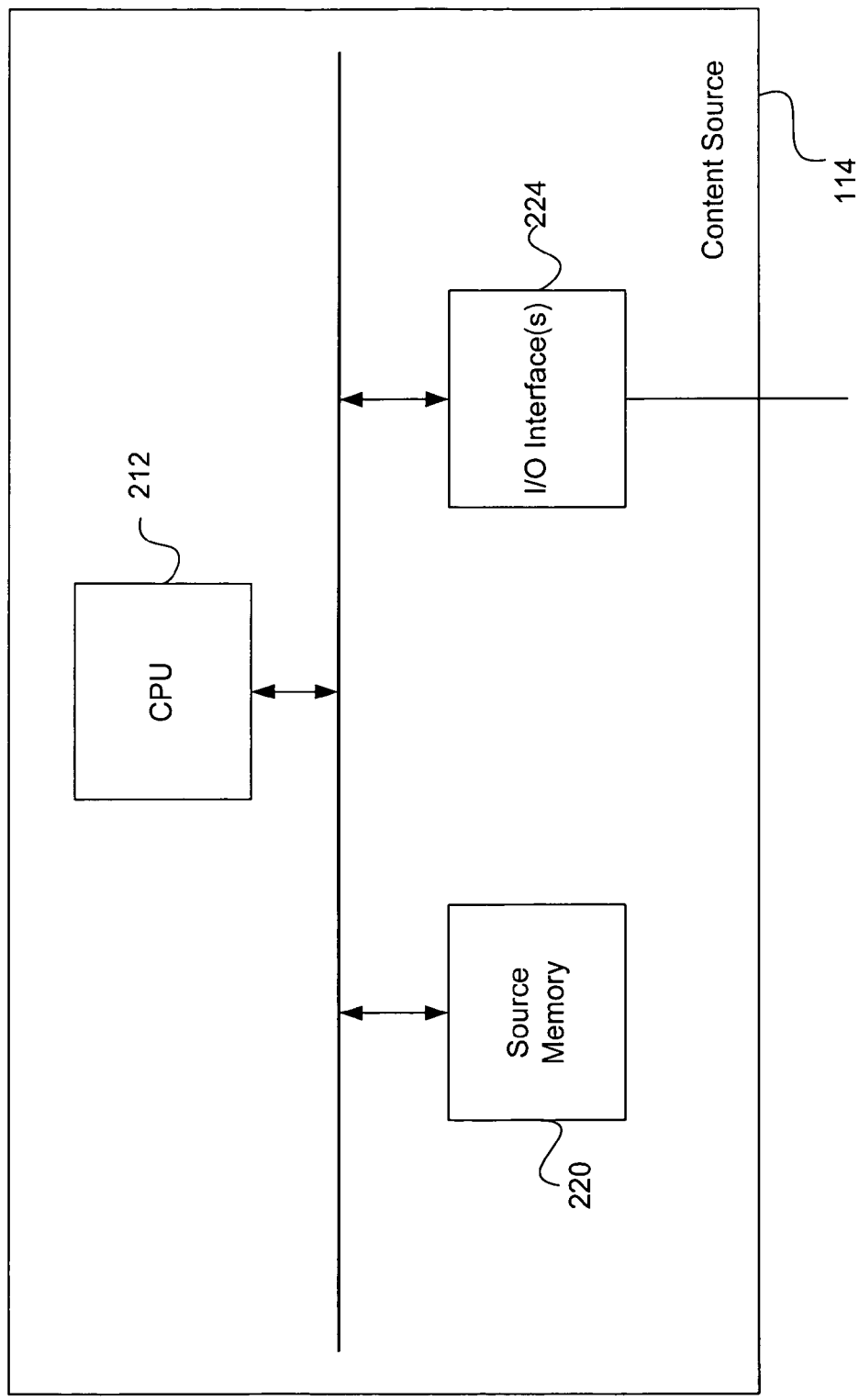
FIG. 2 is a block diagram for one embodiment of the content source of FIG. 1A, in accordance with the present invention.

Referring now to FIG. 2, a block diagram for one embodiment of the FIG. 1A content source 114 is shown, in accordance with the present invention. In the FIG. 2 embodiment, content source 114 may include, but is not limited to, a central processing unit (CPU) 212, a source memory 220, and input/output interfaces (I/O interfaces) 224. In alternate embodiments, content source 114 may be implemented using components and configurations in addition to, or instead of, those components and configurations discussed in conjunction with the FIG. 2 embodiment. In addition, content source 114 may alternately be implemented as any other desired type of electronic device or entity.

In the FIG. 2 embodiment, CPU 212 may be implemented to include any appropriate and compatible microprocessor device(s) that preferably execute software instructions to thereby control and manage the operation of content source 114. In the FIG. 2 embodiment, source memory 220 may be implemented to include any combination of desired storage devices, including, but not limited to, read-only memory (ROM), random-access memory (RAM), and various types of non-volatile memory, such as floppy disks or hard disks. The contents and functionality of source memory 220 are further discussed below in conjunction with FIGS. 3 and 4.

In the FIG. 2 embodiment, I/O interfaces 224 may include one or more input and/or output interfaces to receive and/or transmit any required types of information for content source 114. For example, in the FIG. 2 embodiment, content source 114 may utilize I/O interfaces 224 to communicate with other entities in electronic system 110 (FIG. 1A). Furthermore, a system user may utilize I/O interfaces 224 to communicate with content source 114 by utilizing any appropriate and effective techniques. Additional details regarding content source 114 are further discussed below in conjunction with FIGS. 3-4.

Figure 3:
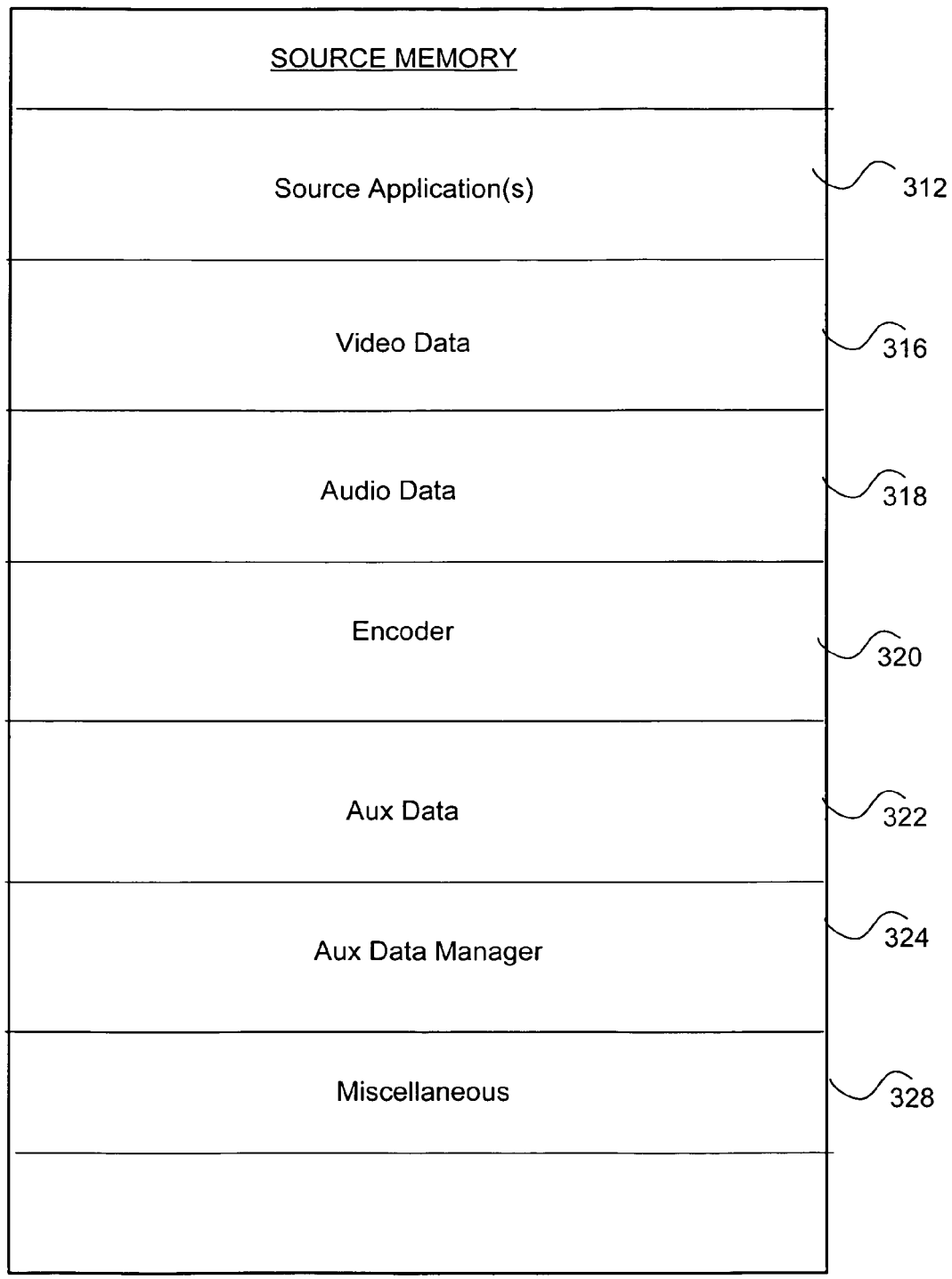
FIG. 3 is a block diagram for one embodiment of the source memory of FIG. 2, in accordance with the present invention.

Referring now to FIG. 3, a block diagram for one embodiment of the FIG. 2 source memory 220 is shown, in accordance with the present invention. In the FIG. 3 embodiment, source memory 220 includes, but is not limited to, one or more source applications 312, video data 316, audio data 318, an encoder 320, auxiliary (aux) data 322, an auxiliary (aux) data manager 324, and miscellaneous information 328. In alternate embodiments, source memory 220 may include components in addition to, or instead of, those components discussed in conjunction with the FIG. 3 embodiment.

In the FIG. 3 embodiment, source application(s) 312 may include program instructions that are preferably executed by CPU 212 (FIG. 2) to perform various functions and operations for content source 114. The particular nature and functionality of source application(s) 312 preferably varies depending upon factors such as the specific type and particular functionality of the corresponding content source 114. In the FIG. 3 embodiment, video data 316 may include any appropriate information or data for display on, or for processing within, television 122 (FIG. 1A). Similarly, audio data 318 may include any appropriate information or data for reproduction by television 122 (FIG. 1A).

In the FIG. 3 embodiment, encoder 320 may include any appropriate means for converting video data 316 and audio data 318 into a compressed distribution multiplex for distribution to television 122. In the FIG. 3 embodiment, aux data manager 324 coordinates and manages various functions for creating aux data 322, and embedding aux data 322 as an integral part of video data 316, in accordance with the present invention. Miscellaneous 328 may include any additional information for utilization by content source 114.

In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. Additional details regarding the functionality of aux data manager 324 and aux data 322 are further discussed below in conjunction with FIGS. 4, 7, and 8.

Figure 4:
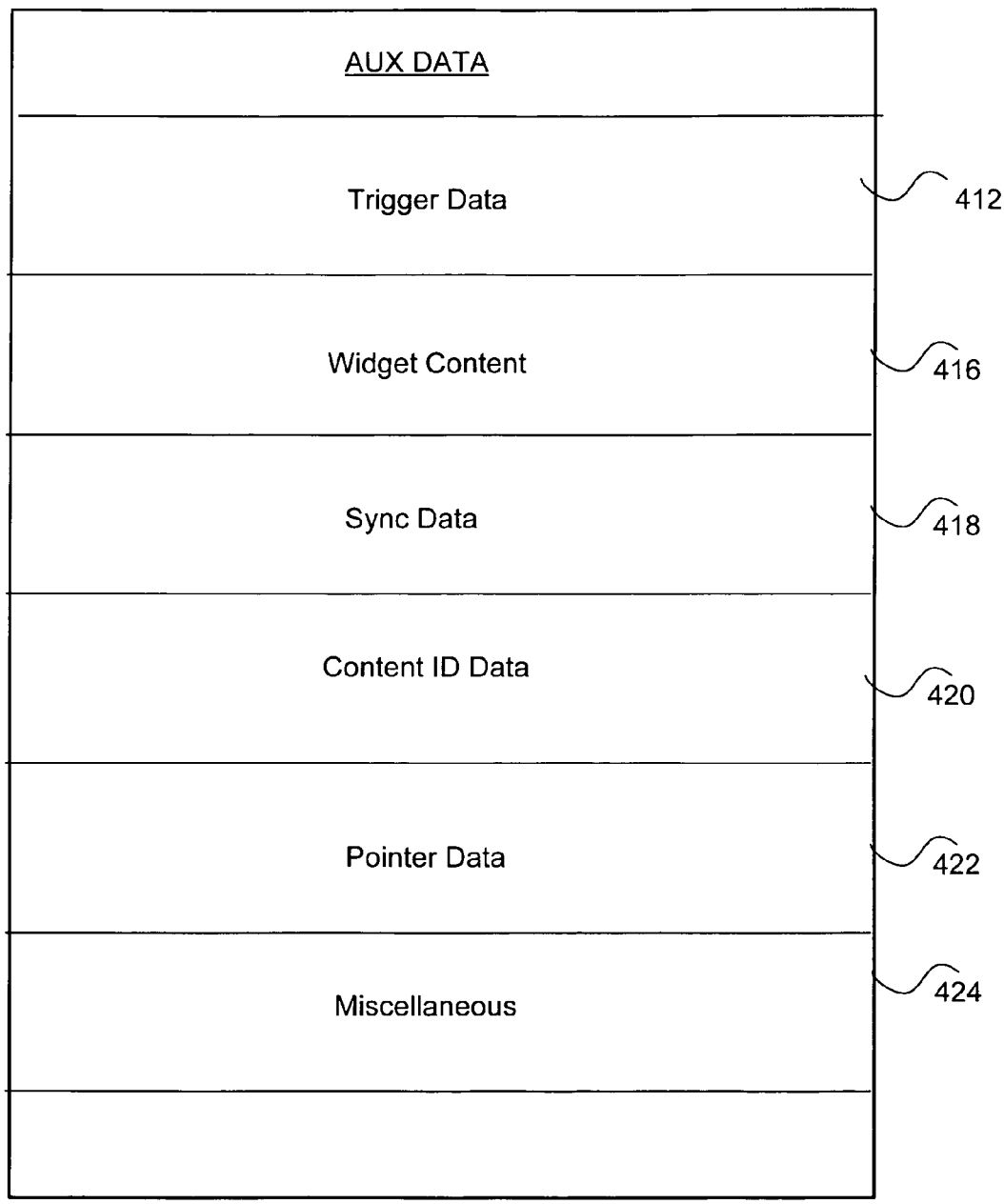
FIG. 4 is a block diagram for one embodiment of the auxiliary data of FIG. 3, in accordance with the present invention.

Referring now to FIG. 4, a block diagram of the FIG. 3 aux data 322 is shown, in accordance with one embodiment of the present invention. In the FIG. 4 embodiment, aux data 322 may include, but is not limited to, trigger data 412, widget content 416, synchronization (sync) data 418, content identification (ID) data 420, pointer data 422, and miscellaneous information 424. In alternate embodiments, aux data 322 may be implemented using various components and functionalities in addition to, or instead of, those components and functionalities discussed in conjunction with the FIG. 4 embodiment.

In the FIG. 4 embodiment, trigger data 412 may include any type of information that defines various characteristics of a widget 144 (FIG. 1B). For example, trigger data 412 may include, but is not limited to, data that defines a widget 144 with respect to widget visual appearance and behavior, information presented by a widget (such as readout values), widget graphical states (such as colors, levels, or settings), and optimal widget location, shape, size, and display times.

In the FIG. 4 embodiment, widget content 416 may include any content data for display in a widget 144. In certain embodiments, widget content 416 may alternately be obtained from sources or entities other than aux data 322. In the FIG. 4 embodiment, synchronization (sync) data 418 may include any appropriate means for allowing television 122 to detect aux data 322 while it is embedded in video data 316. For example, in certain embodiments, sync data 418 may include a pre-defined identification pattern that indicates the specific location of aux data 322 within video data 316.

In the FIG. 4 embodiment, content ID data 420 may include any appropriate information for identifying the specific content of a given corresponding program. For example, in certain embodiments, content ID data 420 may include an International Standard Audio-Visual Number (ISAN) number as an identifier. In the FIG. 4 embodiment, pointer data 422 may include any type of required information that television 122 utilizes to locate and obtain additional information (such as widget content or trigger data) for using in producing synchronized widgets 144.

For example, pointer data 422 may include, but is not limited to, a URL that identifies an Internet location where more information pertaining to the currently-displayed video data 316 may be found. The URL could represent a website on server 130 (FIG. 1A) or elsewhere providing more information about a product being advertised, a URL of a home page of an episode or series, a website where a viewer could sign up for a service or vote on a program, etc. In the FIG. 4 embodiment, miscellaneous 424 may include any additional information for utilization by television 122. For example, in certain embodiments, miscellaneous 424 may include one or more scripts or executable programs. Additional details regarding the creation, distribution, and utilization of aux data 322 are further discussed below in conjunction with FIGS. 7 and 8.

Figure 5:
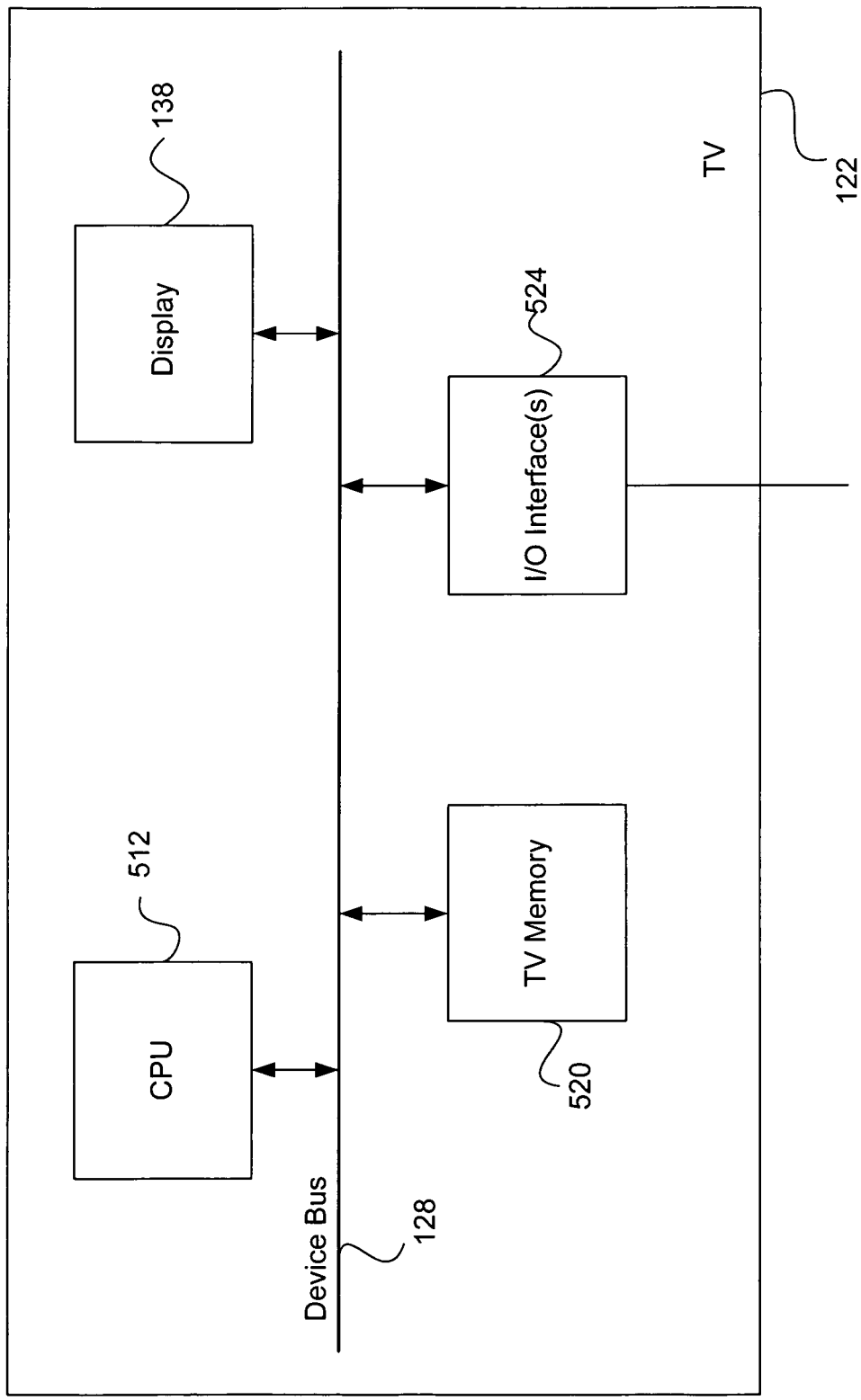
FIG. 5 is a block diagram for one embodiment of the television from FIG. 1A, in accordance with the present invention.

Referring now to FIG. 5, a block diagram for one embodiment of the FIG. 1A television (TV) 122 is shown, in accordance with the present invention. In the FIG. 2 embodiment, TV 122 may include, but is not limited to, a central processing unit (CPU) 512, a display 138, a TV memory 520, and input/output interfaces (I/O interfaces) 524. In alternate embodiments, TV 122 may be implemented using components and configurations in addition to, or instead of, those components and configurations discussed in conjunction with the FIG. 5 embodiment. In addition, TV 122 may alternately be implemented as any other desired type of electronic device or entity.

In the FIG. 5 embodiment, CPU 512 may be implemented to include any appropriate and compatible microprocessor device(s) that preferably execute software instructions to thereby control and manage the operation of TV 122. The FIG. 5 display 138 may include any effective type of display technology including a cathode-ray-tube monitor or a liquid-crystal display device with an appropriate screen for displaying various information to a device user. In the FIG. 5 embodiment, TV memory 520 may be implemented to include any combination of desired storage devices, including, but not limited to, read-only memory (ROM), random-access memory (RAM), and various types of non-volatile memory, such as floppy disks or hard disks. The contents and functionality of TV memory 520 are further discussed below in conjunction with FIG. 6.

In the FIG. 5 embodiment, I/O interfaces 524 may include one or more input and/or output interfaces to receive and/or transmit any required types of information for TV 122. For example, in the FIG. 5 embodiment, TV 122 may utilize I/O interfaces 524 to communicate with other entities in electronic system 110 (FIG. 1A). Furthermore, a system user may utilize I/O interfaces 524 to communicate with TV 122 by utilizing any appropriate and effective techniques. Additional details regarding TV 122 are further discussed below in conjunction with FIGS. 6-8B.

Figure 6:
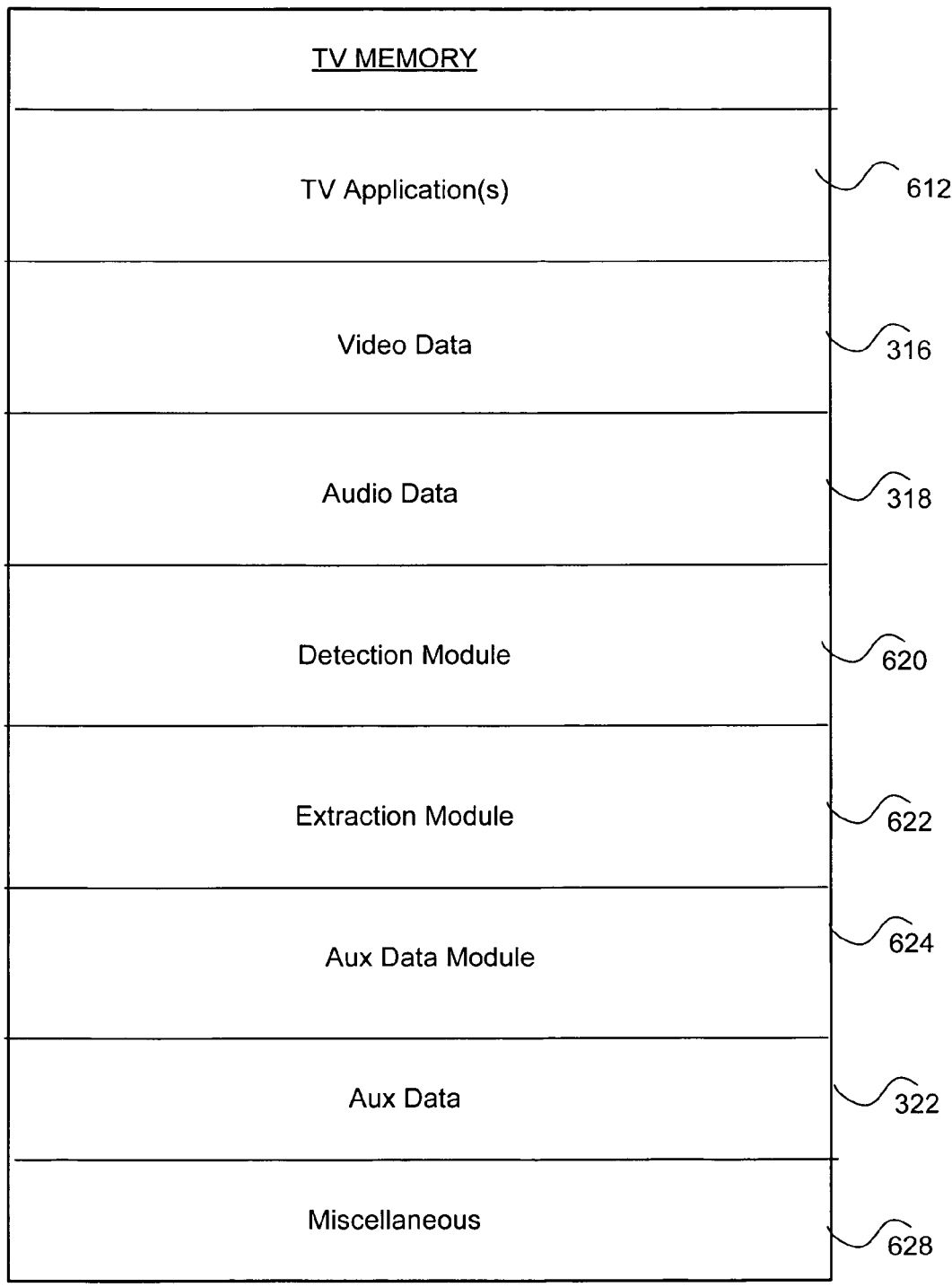
FIG. 6 is a block diagram for one embodiment of the TV memory from FIG. 5, in accordance with the present invention.

In the FIG. 6 embodiment, TV application(s) 612 may include program instructions that are preferably executed by CPU 512 (FIG. 5) to perform various functions and operations for TV 122. The particular nature and functionality of TV application(s) 612 preferably varies depending upon factors such as the specific type and particular functionality of the corresponding TV 122. In the FIG. 6 embodiment, video data 316 may include any appropriate information or data for display on television 122 (FIG. 1A). Similarly, audio data 318 may include any appropriate information or data for reproduction by television 122 (FIG. 1A).

In the FIG. 6 embodiment, TV application(s) 312 may include program instructions that are preferably executed by CPU 512 (FIG. 5) to perform various functions and operations for TV 122. The particular nature and functionality of TV application(s) 612 preferably varies depending upon factors such as the specific type and particular functionality of the corresponding TV 122. In the FIG. 6 embodiment, video data 316 may include any appropriate information or data for display on television 122 (FIG. 1A). Similarly, audio data 318 may include any appropriate information or data for reproduction by television 122 (FIG. 1A).

In the FIG. 6 embodiment, detection module 620 may be utilized by TV 122 to detect and locate aux data 322 that has been embedded in video data 316, as discussed above. In the FIG. 6 embodiment, extraction module 620 may be utilized by TV 122 to remove the detected aux data 322 from the video data 316. In the FIG. 3 embodiment, aux data module 624 coordinates and manages various functions for processing the extracted aux data 322 to effectively support synchronized widgets 144 (FIG. 1B) or other TV applications, in accordance with the present invention. Miscellaneous 628 may include any additional information for utilization by TV 122.

In the FIG. 6 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. Additional details regarding the functionality of aux data module 624 and aux data 322 are further discussed below in conjunction with FIGS. 7 and 8.

Referring now to FIGS. 7A and 7B, diagrams of auxiliary (aux) data 322 embedded in video data 316 are shown, in accordance with two different embodiments of the present invention. FIGS. 7A and 7B present a frontal view of a display 138 from TV 122 (FIG. 1A). The embodiments of FIGS. 7A and 7B are presented for purposes of illustration, and in alternate embodiments, aux data 322 may be embedded using techniques and configurations in addition to, or instead of, certain of those techniques and configurations discussed in conjunction with the embodiments of FIGS. 7A and 7B.

In the FIG. 7A embodiment, display 138 includes a main screen region that typically displays video data 316 provided by a content source 114 (FIG. 1A). In the FIG. 7A embodiment, the displayed video data 316 on display 138 also includes embedded aux data 322 that is preferably located in an unobtrusive area of display 138. In various, different embodiments, aux data 322 may be implemented in any desired shape or size, and may be displayed in any appropriate location(s) on display 138. For purposes of illustration, the aux data 322 in FIG. 7A is depicted as a small cross-hatched rectangle. However, any effective configuration or appearance is equally contemplated for implementing aux data 322.

In the FIG. 7A embodiment, aux data 322 may be encoded to represent any required information (see FIG. 4) in any effective manner. For example, in certain embodiments, aux data 322 may be formatted by utilizing conventional or enhanced bar code technologies. In other words, aux data 322 could be effectively formatted as a video two-dimensional bar code that is embedded in a corner or at the edge of the displayed video data 316. In addition, the bar code or other formatting of aux data 322 could be displayed as a part of a small graphical logo icon known as a "bug." Furthermore, in various other embodiments, aux data 322 may encoded or displayed by utilizing any other effective techniques. For example, aux data 322 could be implemented by modulating various attributes of luminance or chrominance information. In addition, aux data 322 may be implemented by utilizing multiple display lines.

Such an encoding of aux data 322 could represent a substantial amount of information, and could be quite small and dense, as aux data 322 would be read by the TV 122 processing video data 316 in video memory. Where printed barcodes are optimized for readout by laser scanners, the type of video barcode used for aux data 322 is embedded in a digital video signal, which is processed directly by the TV 122 (as pixel luminance or chrominance samples).

In certain embodiments, quantization errors in the video compression could possibly obliterate a video barcode (so a bar code occurring within a fast-moving, hard-to-compress video sequence might not survive). However, if the bar code is left on-screen for some amount of time (a few seconds), that concern is mitigated. The resulting barcode image may not need to be shown with high contrast (black lines on white background), since TV 122 will be able to extract the information via a filtering mechanism. The bar code could thus be encoded with various shades of gray (as long as there is enough contrast for reliable extraction).

As discussed above, aux data 322 could be displayed in conjunction with a graphical logo icon ("bug"), as a caption or border, or it could be placed at one more of the extreme edges of the image (because these are usually cropped before display, and are less obtrusive in any case). The bits of aux data 322 could be spread out spatially over the area of the video frame if the pattern of their location was known to the TV 122 beforehand. Even a small amount of aux data 322, such as the content ID data 420 or the pointer data 422 of FIG. 4, can be of great help in enhancing the user experience, as this information can be expanded via an interaction with a web server 130 (see FIG. 1A) to obtain additional required information including, but not limited to, aux data 322 or content data.

In the FIG. 7B embodiment, display 138 includes a main screen region that typically displays video data 316 provided by a content source 114 (FIG. 1A). In the FIG. 7B embodiment, the displayed video data 316 on display 138 also includes embedded aux data 322 that is preferably located in an unobtrusive area of display 138. In various different embodiments, aux data 322 may be implemented in any desired shape or size, and may be displayed in any appropriate location(s) on display 138. For purposes of illustration, the aux data 322 in FIG. 7B is depicted as a thin cross-hatched line. However, any effective configuration or appearance is equally contemplated for implementing aux data 322.

In the FIG. 7B embodiment, aux data 322 may be encoded to represent the required information (see FIG. 4) in any effective manner. For example, in certain embodiments, aux data 322 may be formatted as one or more horizontal lines of digital video information positioned in or near the region of the video signal's vertical blanking interval (VBI). Because digital television is often encoded with 1280 to 1920 horizontal pixels per scan line, the FIG. 7B VBI configuration for aux data 322 may provide a substantial amount of digital information to TV 122.

The present invention thus supports a method of camouflaging aux data 322 as video data 316 so that a portion of active video (potentially visible to the viewer) is used to convey the aux data 322. In addition, the present invention includes standardizing an encoding format for video aux data 322 to survive video compression and decompression. The present invention further supports embedding aux data 322 in the video image so that the aux data 322 can be recovered (detected, extracted, and processed by TV 122) in a standardized way, without excessive CPU overhead. The implementation and utilization of aux data 322 are further discussed below in conjunction with FIGS. 8A-8C.

Figure 8A:
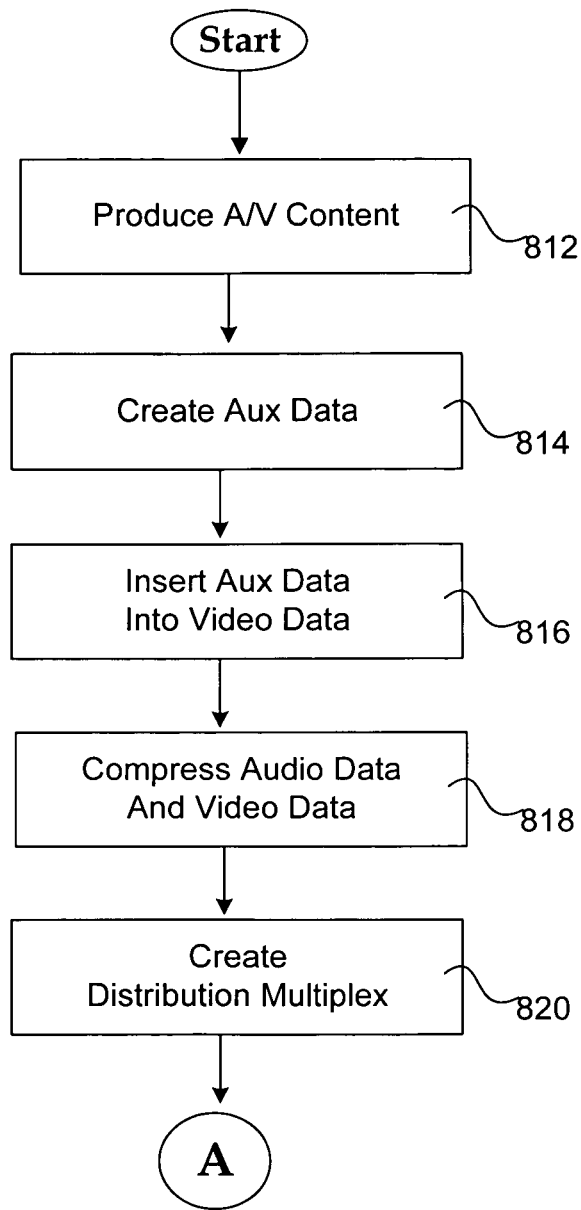
FIGS. 8A-8C are a flowchart of method steps for distributing auxiliary data, in accordance with one embodiment of the present invention.
Figure 8B:
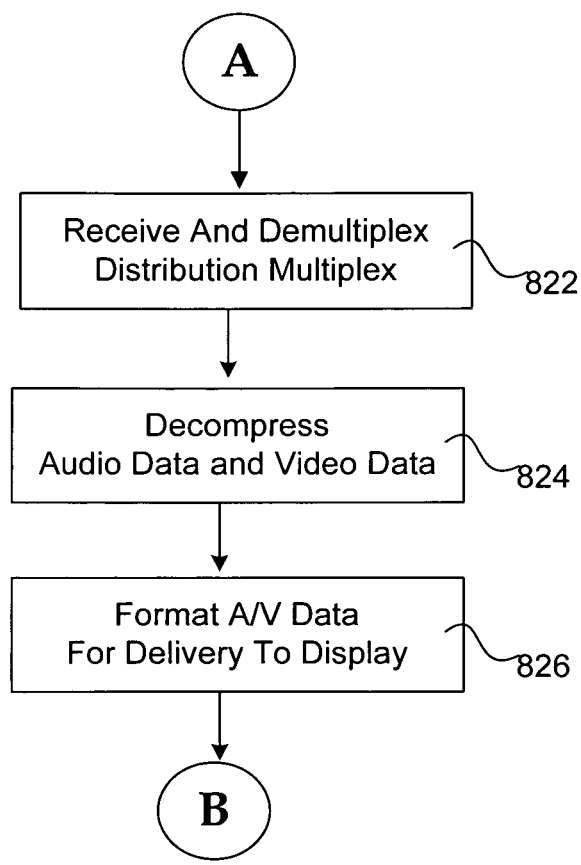
Figure 8C:
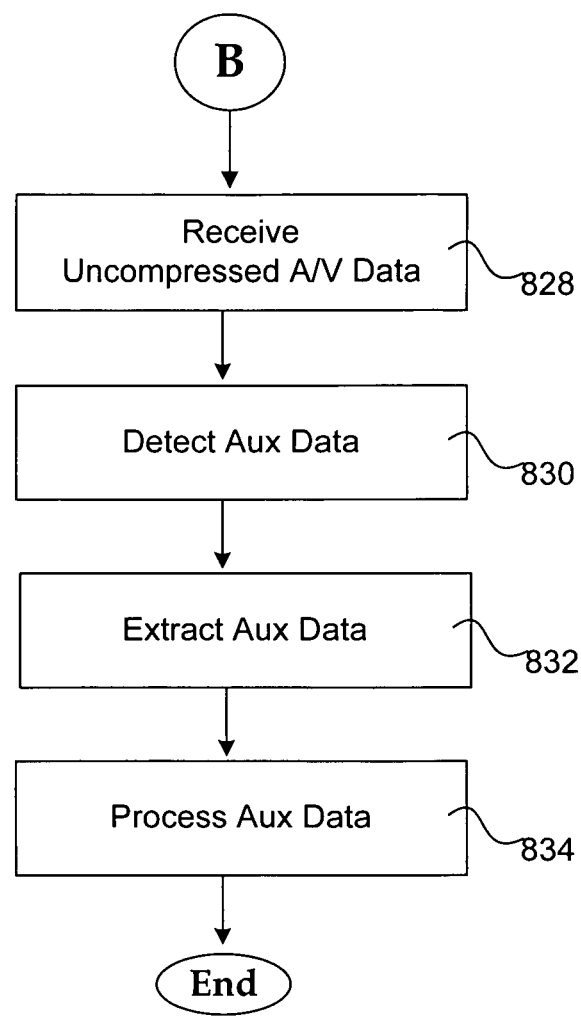

Referring now to FIGS. 8A-8C, a flowchart of method steps for distributing auxiliary data 322 embedded in video data 316 is shown, in accordance with one embodiment of the present invention. The FIG. 8 example is presented for purposes of illustration, and in alternate embodiments, the present invention may utilize steps and sequences other than certain of those steps and sequences discussed in conjunction with the FIG. 8 embodiment.

In the FIG. 8A embodiment, in step 812, a content source 114 or other appropriate entity initially produces A/V content data that typically includes video data 316 and audio data 318. In step 814, the content source 114 or other appropriate entity then creates auxiliary (aux) data 322 to support various advanced interactive features on a television device 122, such as displaying one or more synchronized widgets 144. In step 816, the content source 114 or other appropriate entity inserts the aux data 322 into the video data 316.

In step 818, the content source 114 or other appropriate entity compresses the audio data 318 and the video data 316 (including the embedded aux data 322) to create a compressed distribution multiplex in step 820. The FIG. 8A process then advances to step 822 of FIG. 8B through connecting letter "A."

In step 822 of FIG. 8B, a set-top box 118 or other appropriate entity receives and demultiplexes the distribution multiplex distributed by content source 114 to produce compressed audio data and video data. In step 824, a decoder device of set-top box 118 or other appropriate entity then uncompresses the compressed audio data and video data to produce uncompressed audio data 318 and uncompressed video data 316 (including the embedded aux data 322). In step 826, the set-top box 118 or other appropriate entity formats the audio data 318 and the video data 316 for delivery to a display 138 of the television 122. The FIG. 8B process then advances to step 828 of FIG. 8C through connecting letter "B."

In step 828 of FIG. 8C, television 122 or other appropriate entity receives the uncompressed audio data 318 and uncompressed video data 316 (including the embedded aux data 322). In step 830, a detection module 620 of the television 122 scans the video data 316 to detect the embedded aux data 322 by utilizing any effective techniques. In step 832, an extraction module 622 of television 122 extracts the located aux data 322 from the video data 316. Finally, in step 834, an aux data module 624 processes the extracted aux data 322 to successfully support appropriate advanced interactive features, such as displaying one or more synchronized widgets 144 on a display 138 of television 122. The FIG. 8C process may then terminate.

In certain alternate embodiments, aux data 322 may similarly be created and inserted into the video data 316 by any other appropriate entity at any point along the distribution path. In certain of these alternate embodiments, aux data 322 may be inserted without completely decompressing video data 316. For example, individual macro-blocks of compressed video data 316 (without any aux data 322) could be replaced by corresponding compressed macro-blocks that contain the aux data 322 already embedded. For all of the foregoing reasons, the present invention thus provides an improved system and method for distributing auxiliary data embedded in video data.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A distribution system, comprising: circuitry configured to embed auxiliary data into one or more video frames of video data, and encode said video data together with said auxiliary data to create one or more compressed data units, the auxiliary data being configured to trigger display of a predetermined synchronized widget and including content identification data identifying video data content associated with the predetermined synchronized widget and an Internet location of content of the predetermined synchronized widget, wherein the auxiliary data defines graphical states of the content of the predetermined synchronized widget to be received from the Internet location, including colors, levels, settings, shape, and size of the content of the predetermined synchronized widget, the content of the predetermined synchronized widget being displayed according to the graphical states when the auxiliary data embedded into the video data triggers display of the predetermined synchronized widget.

2. The system of claim 1, wherein said auxiliary data provides widget content supporting the predetermined synchronized widget on a display of a television, said widget content relating to said video data that is simultaneously presented on said display.

3. The system of claim 1, wherein said auxiliary data is formatted as a multi-dimensional video bar code in said one or more video frames of said video data.

4. The system of claim 1, wherein said auxiliary data is formatted as one or more horizontal scan lines that are located in or near a top region or a bottom region of at least one decoded video frame of said video data.

5. The system of claim 1, wherein said auxiliary data is formatted as part of, or embedded within, a graphical icon that is displayed on a television.

6. The system of claim 1, wherein said auxiliary data further includes widget content or synchronization data.

7. The system of claim 1, wherein said auxiliary data further includes trigger data that defines said predetermined synchronized widget with respect to widget visual appearance and behavior and information presented by said predetermined synchronized widget.

8. The system of claim 1, wherein said Internet location provides a URL for contacting an Internet server from which a television obtains additional auxiliary data and widget content for supporting said predetermined synchronized widget.

9. A television device for displaying information from an electronic network, comprising: circuitry configured to identify auxiliary data embedded in one or more video frames or video data by a content source, which encodes said video data together with said auxiliary data to create one or more compressed data units, said compressed data units being received and processed by a decoder to reproduce said video data with said auxiliary data embedded therein, the auxiliary data being configured to trigger display of a predetermined synchronized widget and including content identification data identifying video data content associated with the predetermined synchronized widget and an Internet location of content of the predetermined synchronized widget, the auxiliary data further defining graphical states of the content of the predetermined synchronized widget to be received from the Internet location, including colors, levels, settings, shape, and size of the content of the predetermined synchronized widget, the content of the predetermined synchronized widget being displayed according to the graphical states defined in the auxiliary data when the auxiliary data embedded into the video data triggers display of the predetermined synchronized widget; extract said auxiliary data from said one or more video frames of said video data; process said extracted auxiliary data; and execute one of a plurality of different synchronized widgets that are configured to display supplemental information based on said auxiliary data.

10. The television device of claim 9, wherein said auxiliary data provides widget content supporting at least one of said plurality of synchronized widgets on a display of said television, said widget content relating to said video data that is simultaneously presented on said display.

11. The television device of claim 9, wherein said auxiliary data is formatted as a multi-dimensional video bar code in said one or more video frames of said video data.

12. The television device of claim 9, wherein said auxiliary data is formatted as one or more horizontal scan lines that are located in or near a top region or a bottom region of at least one decoded video frame of said video data.

13. The television device of claim 9, wherein said auxiliary data is formatted as part of, or embedded within, a graphical icon that is visible on a display of said television.

14. The television device of claim 9, wherein said auxiliary data further includes widget content or synchronization data.

15. The television device of claim 9, wherein said Internet location provides a URL for contacting an Internet server from which said television obtains additional auxiliary data and widget content for supporting one of said plurality of synchronized widgets.

16. The television device of claim 9, wherein said processor is configured to display information related and synchronized to the reproduced video data based on the processed auxiliary data.

17. A method for distributing information in an electronic network, the method comprising: embedding, by a content source, auxiliary data into one or more video frames of video data, the auxiliary data being configured to trigger display of a predetermined synchronized widget and including content identification data identifying video data content associated with the predetermined synchronized widget and an Internet location of content of the predetermined synchronized widget, the auxiliary data defining graphical states or the content of the predetermined synchronized widget to be received from the Internet location, including colors, levels, settings, shape, and size of the content of the predetermined synchronized widget, the content of the predetermined synchronized widget being displayed according to the graphical states defined in the auxiliary data when the auxiliary data embedded into the video data triggers display of the predetermined synchronized widget; encoding said video data together with said auxiliary data to create one or more compressed data units; receiving and processing said compressed data units to reproduce said video data with said auxiliary data embedded therein; extracting said auxiliary data by a television that processes said extracted auxiliary data; and executing one of a plurality of different synchronized widgets that are configured to display supplemental information based on said auxiliary data.

18. A non-transitory computer-readable storage medium storing a code for a synchronized widget, which when executed by a computer, causes the computer to perform a method, the method comprising: displaying on a display device, said synchronized widget relating to video data that is simultaneously presented on said display device, wherein said synchronized widget is generated from auxiliary data that is embedded in one or more video frames of said video data and encoded together with said video data, to create one or more compressed data units, the auxiliary data being configured to trigger display of the synchronized widget and including content identification data identifying video data content associated with the synchronized widget and an Internet location of content of the predetermined synchronized widget, the auxiliary data defining graphical states or the content of the predetermined synchronized widget to be received from the Internet location, including colors, levels, settings, shape, and size of the content of the predetermined synchronized widget, the content of the predetermined synchronized widget being displayed according to the graphical states defined in the auxiliary data when the auxiliary data embedded into the video data triggers display of the predetermined synchronized widget.

19. A method of a television device for displaying information from an electronic network, the method comprising: identifying auxiliary data embedded in one or more video frames of video data by a content source, which encodes said video data together with said auxiliary data to create one or more compressed data units, said compressed data units being received and processed by a decoder to reproduce said video data with said auxiliary data embedded therein; the auxiliary data being configured to trigger display of a predetermined synchronized widget and including content identification data identifying video data content associated with the predetermined synchronized widget and an Internet location of content of the predetermined synchronized widget; the auxiliary data defining graphical states of the content of the predetermined synchronized widget to be received from the Internet location, including colors, levels, settings, shape, and size of the content of the predetermined synchronized widget, the content of the predetermined synchronized widget being displayed according to the graphical states defined in the auxiliary data when the auxiliary data embedded into the video data triggers display of the predetermined synchronized widget; extracting said auxiliary data from said one or more video frames of said video data; processing said extracted auxiliary data; and executing, by a processor, one of a plurality or different synchronized widgets that are configured to display supplemental information based on said auxiliary data.

20. The method of claim 19, wherein said auxiliary data provides widget content supporting at least one of said plurality of synchronized widgets on a display of said television, said widget content relating to said video data that is simultaneously presented on said display.

21. The method of claim 19, wherein said auxiliary data is formatted as one or more horizontal scan lines that are located in or near a top region or a bottom region of at least one decoded video frame of said video data.

22. The method of claim 19, wherein said auxiliary data is formatted as part of, or embedded within, a graphical icon that is visible on a display of said television.

23. The method of claim 19, wherein said auxiliary data further includes widget content or synchronization data.

24. The method of claim 19, wherein said Internet location provides a URL for contacting an Internet server from which said television obtains additional auxiliary data and widget content for supporting one of said plurality of synchronized widgets.

25. The method of claim 19, further comprising:
displaying information related and synchronized to the reproduced video data based on the processed auxiliary data.

* * * * *